(12) United States Patent
Muirhead

(10) Patent No.: US 7,874,256 B2
(45) Date of Patent: *Jan. 25, 2011

(54) FIRE RESISTANT PLASTIC PALLET WITH LOW RADIO FREQUENCY RESISTIVITY

(75) Inventor: Scott Arthur William Muirhead, Surrey (CA)

(73) Assignee: Nextreme, LLC, Lemont Furnace, PA (US)

( * ) Notice: Subject to any disclaimer, the term of this patent is extended or adjusted under 35 U.S.C. 154(b) by 502 days.

This patent is subject to a terminal disclaimer.

(21) Appl. No.: 11/894,288

(22) Filed: Aug. 20, 2007

(65) Prior Publication Data

US 2008/0053342 A1 Mar. 6, 2008

Related U.S. Application Data

(63) Continuation-in-part of application No. 10/798,932, filed on Mar. 11, 2004, now Pat. No. 7,735,430, which is a continuation of application No. 09/803,681, filed on Mar. 12, 2001, now Pat. No. 6,718,888, application No. 11/894,288, which is a continuation-in-part of application No. 11/498,118, filed on Aug. 1, 2006, which is a continuation of application No. 10/771,916, filed on Feb. 4, 2004, now Pat. No. 7,378,463.

(60) Provisional application No. 60/196,127, filed on Apr. 11, 2000.

(51) Int. Cl.
*B65D 19/38* (2006.01)
*G08B 26/00* (2006.01)
(52) U.S. Cl. .................... 108/57.25; 340/505
(58) Field of Classification Search ............. 108/57.25, 108/57.27, 57.28, 901, 902, 51.11; 425/135, 425/137, 169; 523/179; 524/100; 340/505
See application file for complete search history.

(56) References Cited

U.S. PATENT DOCUMENTS

| | | | |
|---|---|---|---|
| 3,695,188 A | 10/1972 | Granatstein | 108/58 |
| 3,719,157 A | 3/1973 | Arcocha et al. | 108/51 |
| 3,757,704 A | 9/1973 | Allgeyer et al. | 108/51 |

(Continued)

FOREIGN PATENT DOCUMENTS

DE 10024421 11/2001

(Continued)

OTHER PUBLICATIONS

Brindley, Chaille, "Going Up in Smoke", Industrial Reporting, Inc., Oct. 1, 2001.

(Continued)

*Primary Examiner*—José V Chen
(74) *Attorney, Agent, or Firm*—Price & Adams

(57) ABSTRACT

A halogen free fire resistant RF transparent polymer pallet has attenuated electrical resistance. A pallet body has a fire resistant layer and a substrate supporting the fire resistant layer. The fire resistant layer includes fire retardant materials, such as $Al(OH)_3$, $Mg(OH)_2$, intercalated graphite, zinc borate, and antimony oxide. The substrate is substantially free of the fire retardant materials to reduce the density and the electrical resistance of the pallet body. The fire resistant layer is substantially thinner than the substrate to lower RF distortion effects on RF transponder communications from additives and the conductive materials within an RF tracking system.

20 Claims, 7 Drawing Sheets

U.S. PATENT DOCUMENTS

| | | | | |
|---|---|---|---|---|
| 3,810,862 | A | 5/1974 | Mathis et al. | 260/42.45 |
| 4,220,100 | A | 9/1980 | Palomo et al. | 108/51.1 |
| 4,428,306 | A | 1/1984 | Dresen et al. | 108/53.3 |
| 4,606,278 | A | 8/1986 | Shuert | 108/51.1 |
| 4,727,102 | A | 2/1988 | Scarso | 523/201 |
| 4,879,956 | A | 11/1989 | Shuert | 108/53.3 |
| 5,117,762 | A | 6/1992 | Shuert | 108/51.1 |
| 5,143,778 | A | 9/1992 | Shuert | 428/213 |
| 5,180,767 | A * | 1/1993 | Sakai et al. | 524/411 |
| 5,197,395 | A | 3/1993 | Pigott et al. | 108/56.1 |
| 5,204,393 | A | 4/1993 | Nalepa et al. | 524/101 |
| 5,205,221 | A | 4/1993 | Melin et al. | 108/51.3 |
| 5,356,983 | A | 10/1994 | Vijayendran et al. | 524/416 |
| 5,367,960 | A | 11/1994 | Schleicher | 108/57.32 |
| 5,391,251 | A | 2/1995 | Shuert | 156/292 |
| 5,401,347 | A | 3/1995 | Shuert | 156/245 |
| 5,404,829 | A | 4/1995 | Shuert | 108/51.1 |
| 5,408,937 | A | 4/1995 | Knight, IV et al. | 108/55.5 |
| 5,413,052 | A | 5/1995 | Breezer et al. | 108/56.1 |
| 5,555,820 | A | 9/1996 | Shuert | 108/51.1 |
| 5,566,624 | A | 10/1996 | Brown et al. | 108/51.1 |
| 5,638,760 | A | 6/1997 | Jordan et al. | 108/51.1 |
| 5,643,999 | A | 7/1997 | Lee et al. | 525/193 |
| 5,648,031 | A | 7/1997 | Sturtevant et al. | 264/80 |
| 5,676,064 | A | 10/1997 | Shuert | 108/51.1 |
| 5,687,532 | A | 11/1997 | Torrey | 52/656.3 |
| 5,728,424 | A | 3/1998 | Walling | 427/180 |
| 5,758,855 | A | 6/1998 | Jordan et al. | 248/346.01 |
| 5,806,436 | A | 9/1998 | Weichenrieder, Sr. et al. | 108/57.23 |
| 5,834,535 | A | 11/1998 | Abu-Isa et al. | 523/179 |
| 5,845,588 | A | 12/1998 | Gronnevik | 108/57.27 |
| 5,924,589 | A | 7/1999 | Gordon | 220/23.91 |
| 5,946,878 | A | 9/1999 | Grund et al. | 52/630 |
| 5,984,126 | A | 11/1999 | Gordon | 220/62.22 |
| 5,989,706 | A | 11/1999 | McGinniss et al. | 428/341 |
| 6,006,677 | A | 12/1999 | Apps et al. | 108/57.25 |
| 6,029,583 | A | 2/2000 | LeTrudet | 108/57.25 |
| 6,095,787 | A | 8/2000 | Bills, Sr. | 425/215 |
| 6,109,190 | A | 8/2000 | Hale et al. | 108/57.25 |
| 6,110,559 | A | 8/2000 | De Keyser | 428/68 |
| 6,138,582 | A | 10/2000 | Fujii et al. | 108/57.25 |
| 6,184,269 | B1 | 2/2001 | Abu-Isa et al. | 523/179 |
| 6,228,914 | B1 | 5/2001 | Ford et al. | 524/412 |
| 6,232,377 | B1 | 5/2001 | Hayashi et al. | 524/100 |
| 6,344,508 | B1 | 2/2002 | Endo et al. | 524/313 |
| 6,357,366 | B1 | 3/2002 | Frankenberg | 108/57.25 |
| 6,389,990 | B1 | 5/2002 | Apps | 108/57.25 |
| 6,458,232 | B1 | 10/2002 | Valentinsson | 156/182 |
| 6,528,558 | B2 | 3/2003 | Lewin | 524/100 |
| 6,599,963 | B2 | 7/2003 | Horsey et al. | 358/1.15 |
| 6,632,442 | B1 | 10/2003 | Chyall et al. | 424/400 |
| 6,706,793 | B2 | 3/2004 | Abu-Isa et al. | 524/409 |
| 6,718,888 | B2 | 4/2004 | Muirhead | 108/57.25 |
| 6,758,148 | B2 | 7/2004 | Torrey et al. | 108/51.11 |
| 6,784,234 | B2 | 8/2004 | Adedeji et al. | 524/140 |
| 6,807,910 | B2 | 10/2004 | Apps | 108/57.25 |
| 6,809,129 | B2 | 10/2004 | Abu-Isa | 523/179 |
| 6,849,677 | B2 | 2/2005 | Overholt | 524/412 |
| 6,955,128 | B2 | 10/2005 | Apps | 108/57.25 |
| 6,998,433 | B2 | 2/2006 | Overholt et al. | 524/404 |
| 7,378,463 | B2 * | 5/2008 | Abu-Isa | 524/100 |
| 2002/0155348 | A1 * | 10/2002 | Gitto | 429/163 |
| 2003/0108700 | A1 * | 6/2003 | Krech et al. | 428/35.7 |
| 2004/0006164 | A1 | 1/2004 | Abu-Isa | 524/283 |
| 2004/0059035 | A1 | 3/2004 | Krech et al. | 524/416 |
| 2004/0168618 | A1 | 9/2004 | Muirhead | 108/57.25 |
| 2005/0004281 | A1 | 1/2005 | Adedeji et al. | 524/115 |
| 2006/0004134 | A1 | 1/2006 | Overholt et al. | 524/436 |
| 2006/0011108 | A1 | 1/2006 | Abu-Isa et al. | 108/57.25 |
| 2006/0236903 | A1 | 10/2006 | Moore | 108/57.25 |

FOREIGN PATENT DOCUMENTS

| | | |
|---|---|---|
| EP | 0400640 | 12/1990 |
| EP | 1331242 | 7/2003 |
| JP | 1101346 | 4/1989 |

OTHER PUBLICATIONS

Catastrophic Fire Prevention Task Force, Progress Report on Appropriate Use of Plastic Pallets, undated publication, p. 1-2.

Electronics Industry Pallet Specification Draft Updated Sep. 6, 2001, p. 8.

English language version of the abstract for German Patent Document No. DE10024421 downloaded from www.espacenet.com on Feb. 2, 2007.

Extreme™ Pallet, General Electric Company Publication brochure GID-PAL-120 2 pages.

"Fire and Polyvinyl Chloride", The Vinyl Institute, 1996, pp. 1-16.

Witt, Clyde E., "Jumping Through Plastic Hoops of Fire", Material Handling Management, Oct. 2002.

* cited by examiner

FIRE RESISTANT PLASTIC PALLET WITH LOW RADIO FREQUENCY RESISTIVITY

CROSS REFERENCE TO RELATED APPLICATION

This application is a continuation in part of U.S. patent application Ser. No. 10/798,932 filed on Mar. 11, 2004, which claims the benefit of U.S. patent application Ser. No. 09/803,681 filed on Mar. 12, 2001, now U.S. Pat. No. 6,718,888 issued on Apr. 13, 2004. U.S. patent application Ser. No. 09/803,681 claims the benefit of U.S. Provisional Application No. 60/196,127 filed on Apr. 11, 2000. This application is also a continuation in part of U.S. patent application Ser. No. 11/498,118 filed on Aug. 1, 2006, which is a continuation of U.S. patent application Ser. No. 10/771,916 filed on Feb. 4, 2004 and published on Aug. 4, 2005 as U.S. Patent Publication No. 2005/171254, which was filed on even date with U.S. patent application Ser. No. 10/771,972 published as U.S. Patent Publication No. 2005/0170238. The disclosures of the above applications are incorporated herein by reference.

BACKGROUND OF THE INVENTION

1. Field of the Invention

This invention relates to a halogen free polyolefin material composition, and in particular to a non-halogenated fire resistant plastic pallet that produces a reduced health risk to fire fighters during fires, poses less environmental stress when made and used, offers greater RF transparency for use of electronic devices, allows a lower usage of comparably expensive fire retardant additives, yields a lower weight structure for transport fuel savings and ergonomic handling and is 100% recyclable.

2. Description of Related Art

The wooden pallet is an integral part of North America's distribution system. Wooden pallets are involved in the movement of a significant proportion of all goods bought and sold. The U.S. Forest Service estimated that there were 1.9 billion wooden pallets in America in 1999. Approximately 400 million new pallets are needed each year. One hundred seventy five million of these are pallets repaired for reuse by industry. Therefore, roughly 225 million new wooden pallets enter the supply chain each year.

The Grocery Manufacturers of America (GMA), the largest end-user of traditional 48 inch by 40 inch wooden pallets, have set forth the following specifications for GMA style pallets: (1) exact 48-inch×40-inch dimensions. Square in each direction; (2) true four-way entry that is capable of accommodating existing pallet jacks from all four sides (as opposed to current style with cutouts and stringers); (3) minimum-width pallet jack openings of 12 inches and minimum height of 3¾ inch clearance when under load with the width of each center support being less than six inches to accommodate pallet jacks; (4) smooth, non-skid, top-bearing surface should have at least 85% coverage (with 100% being preferred) and the non-skid surface should be flat with no indentations or protrusions that could cause product damage; (5) bottom-bearing surface of no less than 60% coverage with properly placed cut-outs (12-inches square) for pallet jack wheels from four sides with the surface being flat or having no indentations or protrusions that could cause product damage; (6) all bottom entry edges should be chamfered to ½-inch for easy entry and exit; (7) overall height of platform should not exceed six inches; (8) rackable from both the 48-inch and 40-inch dimensions with an allowable deflection in drive-in and drive through racks of no more than ½ inch; (9) compatible with pallet conveyors, pallet dispensers, skate-wheel pallet-flow racks, and automatic storage and retrieval systems; (10) no protruding fasteners; (11) must be made of material that does not contaminate the product that it carries; (12) must meet or exceed current pallet resistance to fire; (13) must be recyclable (preferably made of recycled material); (14) desired weight under 50 pounds; (15) load capacities of 2,800 pounds and capable of bearing 2,800-pound loads safely in stacks five loads high; (16) repairs should be economically feasible; (17) weather resistant; (18) moisture resistant; and (19) capable of safely moving product, damage free, through the entire distribution channel with multiple cycles (from manufacturer through distributor to retail).

Recently, plastic materials have replaced wood with polyolefins, such as polyethylene and polypropylene, as the primary plastic materials that are used to construct plastic pallets. Polyethylene and polypropylene are among the most widely used plastic materials. Polyethylene and polypropylene provide excellent chemical resistance, easy manufacturability, strength, toughness and durability.

High density polyethylene (HDPE) and ultra high molecular weight polyethylene (UHMWPE) are the preferred materials within the thermoforming sector of the plastics processing industry because of their relative ease of processiblity compared to polypropylene. Polyethylene grades exhibit heat deflection temperatures between 170° F. and 203° F. Polypropylene is more often a preferred material within the injection molding sector of the plastics processing industry because of its relative ease of processibility in this molding art. Polypropylene is also the preferred material for structural foam molded pallets.

Pallets used in the grocery industry supply chain, for example, including wood pallets, must be 48×40 inches and able to support heavy loads (up to 2,800 pounds) when placed upon warehouse racks with commodities stored thereon. When elevated temperatures exist within the warehouse, the heavy load of the commodity can cause the polyethylene and polypropylene pallets to deflect due to the fact that ordinary warehouse racks only support pallets at their edges. Polyethylene becomes rubbery at temperatures exceeding 120° F. and loses its strength. Polypropylene provides greater stiffness and retains its strength at temperatures up to 150° F. Polyethylene and polypropylene are also the lowest cost commodity grade resins available on the market.

One approach to overcoming heat deflection problems is to add thermosetting resins to the polyolefin base material to provide increase stiffness and load strength. U.S. Patent Application Publication Nos. 2003/0108700 and 2004/0059035 disclose a plastic shipping or storage container having a friction material on the outer surface. The container is formed from a material that has a thermosetting component, a polyolefin component, and a friction layer component. The friction layer component provides the protected surface of the container with a static coefficient of friction of dry or wet surfaces in the range of 0.60 to 1.20, preferably in the range of 0.75 to 1.00, and more preferably in the range of 0.80 to 1.00. For oily surfaces, a desirable container coefficient of friction is in the range of 0.30 to 1.00, preferably in the range of 0.40 to 1.00, and more preferably in the range 0.50 to 0.95. In some embodiments of the invention the container is provided with different coefficients of friction in different locations on the container. The thermosetting component requires a catalyst for curing to form a semi-interpenetrating network.

Most traditional polyolefin resins that include thermosetting components cannot be processed using conventional thermoforming and injection molding techniques. The equipment required to process resins that include thermosetting components, such as the resins disclosed in U.S. Patent Application Publication Nos. 2003/0108700 and 2004/0059035, is not the same as those organized for purely thermoplastic resins. Resins that include thermosetting components can be processed by resin transfer molding, sheet molding compounding, and other similar molding technologies.

Another problem with adding thermosetting resins to a thermoplastic pallet material is that thermosetting resins add weight to the finished product. The additional weight increases transportation costs through increased fuel costs. The additional weight also increases the potential for injury by decreasing the ergonomics of the pallet. Thermosetting resins are also not readily recycled.

Another approach to overcoming heat deflection problems is to add fibers or fillers to the base material to add strength. U.S. Pat. No. 5,143,778 discloses a polyethylene structural material that is reinforced with talc fillers. Fibers and filler can replace rigid cross members.

Another problem with plastic pallets is fire resistance. While wood is inherently combustible and easily ignited, the National Fire Protection Association (of America)(NFPA) has raised concerns about the fire-related risks of plastic pallets. The NFPA promulgated NFPA 231 code standards governing sprinkler systems that suppress fires in warehouses involving wood pallets. The NFPA 231 code standards reduced the severity of fires involving wooden pallets as the source of risk.

The National Association of Fire Marshals, the NFPA, the insurance industry, pallet users, and other members of the fire community have determined that NFPA 231 fire suppression systems are inadequate to suppress the increased heat and combustibility of plastic pallet fires. The fire community replaced NFPA 231 with NFPA 13 in 1999 to distinguish the fire risk of wood and plastic pallets.

The NFPA 13 change allows plastic pallets to be treated like wooden pallets if test data indicates that the burning characteristics of the tested plastic pallets are equal to or better than wood. The Underwriters Laboratory (UL) 2335 and Factory Mutual (FM) 4995 test protocols were subsequently developed to classify plastic pallets that meet NFPA 13. UL 94 5VA is the highest (most flame retardant) UL 94 rating system. A 5VA rating does not insure compliance with UL 2335. Polyethylene and polypropylene overwhelmingly represented the highest portion of the preferred materials for the manufacture of plastic pallets at the time of the NFPA 13 change.

NFPA 13 also places other restrictions on wood pallets and plastic pallets that comply with UL 2335 and FM 4995 standards. For example, it is a code requirement that empty pallets that are stacked together (in "idle storage") are stored outside the warehouse in order to reduce the fire risk posed by both wood and plastic pallets during idle storage if the sprinkler systems have not been upgraded to particular NFPA standards. These additional code restrictions reduce the over-all efficiency of a smooth flowing distribution operation and add further handling and storage costs. The problem of retrieving pallets from outside in winter with snow on the ground using a fork-lift is a case in point. If a much reduced fire risk pallet was used, the NFPA standards could be modified to allow for the idle storage of low fire risk plastic pallets that have a "lower" rather than "equal" risk with wood to be kept in idle storage inside a warehouse. A low risk plastic pallet is therefore needed to improve the supply chain.

Another small-scale test is set forth in ASTM E1354. The ASTM E1354 test is used by the fire community to pre-test a raw material. This bench-scale test is performed before a potential pallet is submitted for full-scale testing as a pallet according to UL 2335 or FM 4995 test methods. Ordinary polyethylene and polypropylene that are tested according to ASTM E1354 have significantly higher average peak heat release rates than wood. Therefore, the commercial viability of ordinary polyethylene and polypropylene pallets was greatly reduced with the NFPA 13 change.

One approach to reduce the fire related risks associated with polyolefin pallets is to replace the polyolefin materials with other plastics. U.S. Pat. No. 6,784,234 discloses a high performance plastic pallet that utilizes resin compositions that include polyphenylene ether (PPE) homopolymers or copolymers. The PPE resins perform as well or better than wood in UL 2335 testing, typically having an average peak heat release rate of +/−550 kW/m$^2$ with a heat flux of 35 kW/m$^2$. The disclosed PPE resins are highly engineered resins that typically cost more than four times the cost of ordinary polyethylene and polypropylene. The PPE resins are also heavier than ordinary polyethylene or polypropylene. Consequently, PPE resins have not been widely used to make pallets because of expense and weight considerations.

U.S. Patent Application Publication No. 2005/0004281 discloses a high performance plastic pallet. The pallet is manufactured from polyphenylene ether resin, polycarbonate resin, vinyl aromatic graft copolymer resin, polyetherimide resin, or thermosetting resins. The pallet has an open deck design. The pallet is also designed to pass the UL 2335 protocol.

Another approach is to add fire retardants to the polyolefin base material. These additives may be incorporated into an outer coating or into the base material. U.S. Pat. No. 6,758,148 discloses a pallet assembly having at least one pallet member having external surfaces and a flame retardant material affixed to at least one pallet member so as to substantially cover all of the external surfaces of the pallet member. The fire retardant material includes poly-tetrafluoroethylene (PTFE) or teflon.

The introduction of fire retardant additives reduces the processibility of the plastic material having fibers and fillers while adding extra procurement and implementation costs. U.S. Pat. No. 6,998,433 discloses a pallet having up to 30 wt % magnesium hydroxide, 8 wt % alumina trihydrate, 8 wt % zinc borate, and 54 wt % polyolefin resin. The preferred embodiment has 38 wt % of fire retardants. Highly loaded materials (i.e. materials loaded in excess of 45%) have reduced processibility of the base material.

Also, highly loaded materials have a reduced capacity for reinforcing fibers and fillers, which must be replaced by rigid cross members to provide elevated temperature load strength. Rigid cross members add cost and weight to the finished product.

Several halogenated fire retardant packages that a practitioner can blend into a polyethylene or polypropylene resin are commercially available. For example, Faralloy® PE-106 is an extrusion grade, UV resistant, non-blooming flame retardant HDPE supplied by O'Neil Color and Compounding of Garfield, N.J.

Fire resistant additives for polyethylene and polypropylene may also include halogenated organic brominates, chlorinates, phosphates and phosphorus flame retardants. These additives can be used to construct fire resistant pallets having an average peak heat release rate of less than 600 kW/m$^2$ at a heat flux of 35 kW/m$^3$, according to ASTM E 1354. Halogenated materials, however, are known to be dangerous to fire fighters and the environment because they release hazardous gases during fire.

U.S. Pat. No. 6,807,910 discloses a pallet assembly that include halogen based flame retardant resin additives that are added to the polyolefin materials like polyethylene and polypropylene to provide acceptable flame resistance. The plastic pallet can be fabricated from just one type of material.

U.S. Pat. No. 6,955,128 discloses a pallet assembly that includes halogen based flame retardant resin additives. The pallet assembly includes a series of triangular holes on the top surface and a series of ribs on the underside. The structure includes holes that provide a pathway for flames to migrate through the pallet, which can ignite combustible objects or commodities supported upon the pallet. The exposed ribs also increase the surface area of exposure to fire and provide more potential fuel for combustion.

U.S. Pat. No. 6,849,677 discloses a pallet that uses a polyolefin molding resin containing a flame retardant package containing a halogenated organic flame retardant, alumina trihydrate, and antimony trioxide. The flame retardants are supplied as a master batch at a concentration higher than that desired in the pallet, in a polyolefin-compatible polymer. The flame retardant ingredients are incorporated into the polyolefin by conventional techniques. The halogenated fire retardant is tetra-bromobisphenol A (TBBA), a brominated flame retardant having the formula $(CH_3)2C[C_6H_2(Br)_2OH]_2$. TBBA and other halogenated precursors are also widely used in the cable and wire industry where PE and PP jackets are provided with fire retardant additives so that the cable and wire casing will not ignite and allow a fire to migrate from room to room.

The disclosed inorganic metals and compounds identified are commercially available in master batch quantity from O'Neil Color and Compounding of Garfield, N.J. The O'Neil Color & Compounding UL Yellow Card for Faralloy® PE-401, has the highest 94-5VA rating.

It is also widely known that antimony trioxide and zinc borate are substantially interchangeable inorganic compounds that act as synergists with hydrated alumina and magnesium and promote lower smoke release rates, as measured in ASTM E1354. Finally, zinc borate would be preferred over antimony for its smoke density fighting proficiency and white smoke coloration.

U.S. Pat. Nos. 5,834,535 and 6,184,269 disclose moldable intumescent compositions that provide a heat or fire barrier to a polyethylene or chlorinated polyethylene base material. An intumescent material is one that undergoes a chemical change when exposed to heat and fire, forming expanding bubbles that harden into a dense, heat insulating multi-cellular char. At the same time that the char is forming, metal oxides release water to wick the fire to provide a fire resistant effect.

The disclosed moldable resin formulations include inorganic water emitting substances (hydrated magnesium, alumina, and intercalated graphite), organic nitrogenous agents that release gases that inhibit combustion (ureas, melamine, cyanurates, and carbonates), smoke suppressants (antimony trioxide and zinc borate), and strengthening fillers (fibers and particles). The composition can be blow molded, injection molded, compression molded or otherwise suitably molded and shaped to a desired geometry or configuration by thermal processes. A small amount of hydrated carbon that is beneficial for the formation of char in a process of intumesence is also disclosed.

The disclosed compositions utilize an organic nitrogenous agent. These nitrogenous agents release gases that inhibit combustion. Nitrogenous agents include ureas, melamine, cyanurates, carbantes and the like. The Abu-Isa formulations provide a two-stage fire suppression effect, whereas the Overholt formulations provide only a single stage fire suppression effect.

U.S. Pat. No. 6,706,793 discloses an intumescent polymer composition. The composition includes a halogenated polymer and an intumescent additive. The intumescent additive includes antimony oxide and intercalated graphite.

U.S. Pat. No. 6,809,129 discloses a moldable elastomeric intumescent material. The material includes chlorinated polyethylene, plasticizers, phosphate based foaming agents, char forming materials, antioxidants, intumescent materials, flame retardant materials, and graphite and/or expandable graphite. The material may also include a curing agent or a co-curing agent.

The materials described therein contain halogenated materials, namely, chlorinated polyethylene, which may generate corrosive HX gases, such as HCl. These toxic by-products are dangerous to persons exposed thereto. Many similar efforts to develop flame retardant systems utilize halogenated components because halogens are very efficient fire retardants. However, because they are environmentally unfriendly, it is desirable to find a fire retardant system that does not use halogens.

U.S. Pat. No. 6,998,433 discloses flame retardant molded polyolefin pallets. The disclosed polyolefin material includes a flame retardant package that includes magnesium hydroxide, alumina trihydrate, and zinc borate. Alumina trihydrate, and its functional hydrated alumina equivalent $Al(OH)_3$, on heating to a critical temperature decomposes into 66% alumina and 34% water. Alumina trihydrate (ATH) has a specific gravity of 2.42 $g/cm^3$. (polyethylene and polypropylene have a specific gravity below one +/−0.95 $g/cm^3$). The disclosed inorganic metals and compounds identified are commercially available in master batch quantity from O'Neil Color and Compounding of Garfield, N.J.

U.S. Patent Application Publication No. 2006/0004134 also discloses flame retardant molded polyolefin pallets. The disclosed polyolefin material includes magnesium hydroxide as the primary fire retardant component.

U.S. Pat. No. 6,228,914 discloses an aqueous intumescent composition that includes a melamine compound, an acidic phosphorous compound, and expandable graphite flake. The graphite flake is present in an amount of from 10 to 60 percent by weight. The disclosed compostion could not be employed in the practice of the present invention because it has a relatively low "onset" intumescent temperature, which means that it will commence exfoliation generally after only a few seconds of exposure to an elevated temperature.

U.S. Patent Application Publication No. 2004/0006164 discloses an intumescent fire retardant polymeric composition. The composition includes a thermoplastic polymer, an intumescent, and a fire-resistant additive. The thermoplastic polymer has less than fifty weight percent of the total composition.

U.S. Pat. No. 5,984,126 discloses a non-metallic industrial container, such as a plastic drum, a fiber drum, composite intermediate bulk container, or other suitable industrial container, having a fire resistant outer layer. The fire resistant outer layer is a thermoplastic polymer filled with intumescent powder. The outer layer is co-extruded onto the structure.

Therefore, a need for light weight, low cost polyethylene and polypropylene pallets having high temperature load bearing strength and fire resistance exists. An additional need exists for a plastic pallet that poses a significantly lower fire risk than wooden pallets. Such pallets provide a significantly lower fire risk than wood that is stored inside a warehouse or wood that is stored on ordinary warehouse racking. Such pallets also achieve lower insurance risk premiums.

Many of the patents and patent applications that are discussed in this section have filing dates that occurred after one or more of the priority dates for the patents and patent applications that are identified in the previous section. Accordingly, the citation and discussion of a patent or patent application in this section should not be construed as an admission that that patent or patent application is a prior art reference.

SUMMARY OF THE INVENTION

In accordance with the present invention there is provided a pallet. A thermoplastic pallet body has a fire retardant layer and a support layer. The fire retardant layer includes a polyolefin material and fire retardant fillers that provide an average peak heat release rate between 300 kW/m$^2$ and 500 kW/m$^2$ with a heat flux of 35 kW/m$^2$. The support layer has a polyolefin material with an effective amount of low resistivity additives imparting high temperature strength. An RF transponder having a unique identifier for identifying the pallet within a network is positioned within the pallet body. The pallet body has attenuated resistance to RF signals. The fire retardant layer and the support layer are substantially halogen free.

Further in accordance with the present invention, there is provided a plastic pallet for use in an RF tracking system. A pallet body has an outer layer positioned on the exterior of the pallet body and an inner layer for providing load support to the outer layer. The outer layer has fire retardant additives that include conductive materials. The outer layer is substantially thinner than the inner layer to lower RF distortion effects on RF transponder communications from the fire retardant additives and the conductive materials within the RF tracking system.

Further in accordance with the present invention, there is provided a halogen free fire resistant RF transparent polymer pallet having attenuated electrical resistance. A pallet body has a fire resistant layer and a substrate supporting the fire resistant layer. The fire resistant layer has fire retardant materials selected from the group consisting of Al(OH)$_3$, Mg(OH)$_2$, intercalated graphite, zinc borate, and antimony oxide. The substrate is substantially free of the fire retardant materials to reduce the density and the electrical resistance of the pallet body.

Further in accordance with the present invention, there is provided a fire resistant polymer pallet structure having a resistive layer with an attenuated penetration depth. A surface layer has a low density polyethylene blend with a halogen free organic water emitting substance. A substrate layer has a high density polyethylene blend with a filler selected from the group consisting of non-resistive strengthening fibers, flakes and fillers.

Further in accordance with the present invention, there is provided a polymer pallet for attenuating resistivity. A pallet body has a first layer with fire retardant materials added therein and a second layer that is substantially free of the fire retardant materials. The first layer is co-extruded with the second layer to form a uniform wall having sufficient thickness to support a load. The wall propagates a magnetic field emanating from a source direction that is positioned adjacent to the first layer to a transponder that is positioned in a direction adjacent to the second layer.

Accordingly, a principal object of the present invention is to provide a GMA style 40×48 inch rackable pallet that weighs 50 pounds or less.

Another object of the present invention is to provide a GMA style pallet that is skid resistant.

A further object of the present invention is to provide a GMA style pallet that is not harmful to fire fighters attending a fire.

Another object of the present invention is to provide a GMA style pallet that is amenable to the use of RF tracking devices.

Another object of the present invention is to provide a GMA style pallet that can withstand the handling conditions operating in a material handling environment.

Another object of the present invention is to provide a GMA style pallet that is 100% recyclable.

A further object of the present invention is to provide a GMA style pallet that is low in cost.

Another object of the present invention is to provide a GMA style pallet that comprises a deck and a base, and in particular a deck that provides up to 100 percent surface coverage.

A further object of the present invention is to provide a GMA style pallet that comprises a deck and a base, and in particular a base that provides up to 60 percent surface coverage.

These and other objects of the present invention will be more completely described and disclosed in the following specification, accompanying drawings, and appended claims.

DESCRIPTION OF THE PREFERRED EMBODIMENTS

The fire resistant apparatus of the present invention is employed with apparatus similar to that illustrated in U.S. Pat. No. 6,718,888, which discloses a fire resistant pallet. The pallet includes a first polyolefin layer having intumescent materials and a co-extruded second layer. The pallet utilizes a moldable intumescent resin particularly suitable for thermoforming applications and amenable to deep draw ratios of 400%, which is disclosed in U.S. Pat. No. 5,834,535.

Samples of a plastic sheet that include a halogen free intumescent material mixture that otherwise resembles the composition disclosed in U.S. Pat. No. 5,834,535 were laminated over a halogen free layer of high density polyethylene material. The mixture simulated an externally facing co-extruded plastic wall. The samples were tested according to ASTM E1354 and found to have an average peak heat release rate of 203 kW/m$^2$. This high level of fire retardation is significantly more effective than ordinary fire resistant polyethylene materials. This material is also more effective than such high cost engineered materials that meet the UL 2335 standard, such as Noryl® thermoplastic resins from General Electric Company of Selkirk, N.Y.

The fire resistant halogen free apparatus of the present invention is also employed with apparatus similar to that illustrated in U.S. Pat. Nos. 6,943,678 and 7,097,900. The apparatus is also employed with apparatus similar to U.S. Patent Application Publication No. 2005/0237184. Detailed descriptions of the disclosed methods and apparatus will not be discussed herein. The present invention will be described as it relates to apparatus disclosed in the above enumerated patent and patent application. The above enumerated patents and patent application are also incorporated herein by reference.

Figure 1:
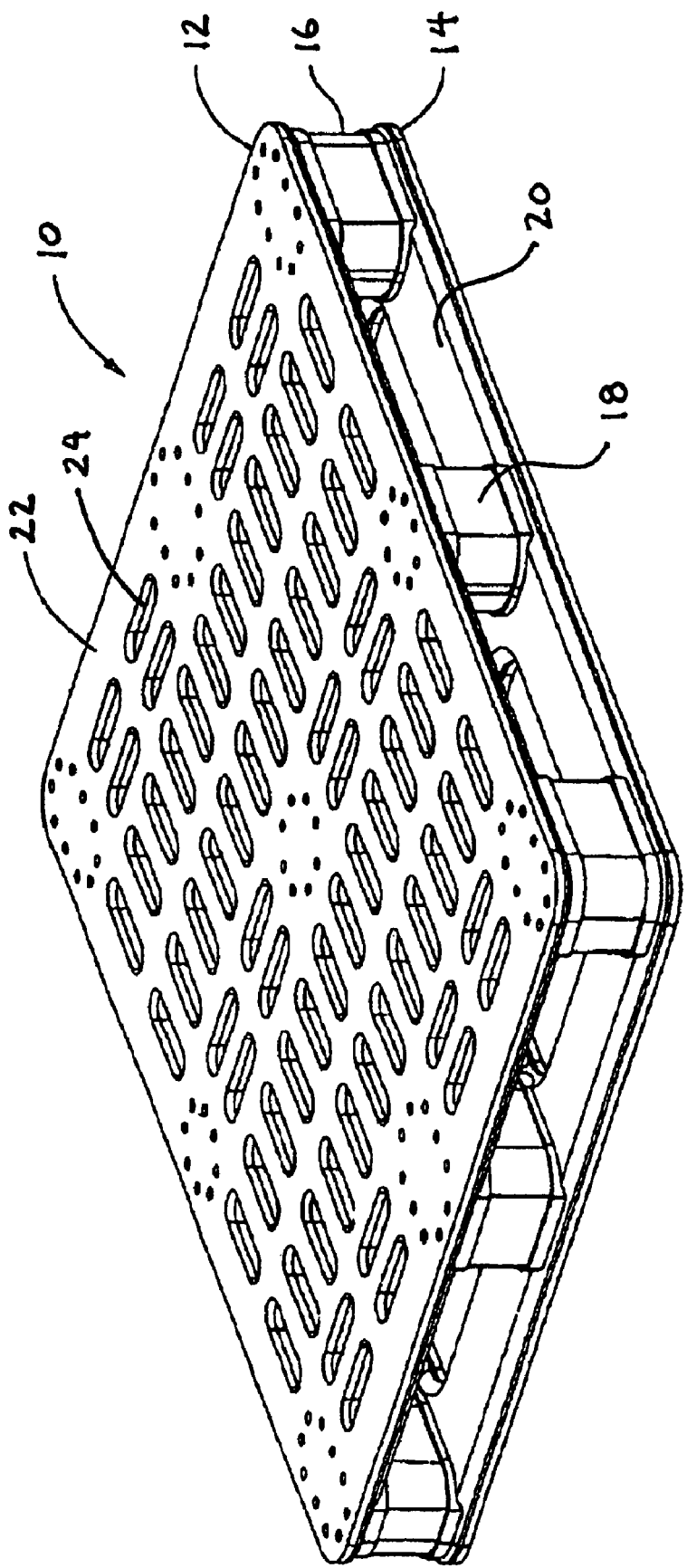
FIG. 1 is an isometric view of a conventional injection molded pallet assembly.
Figure 2:
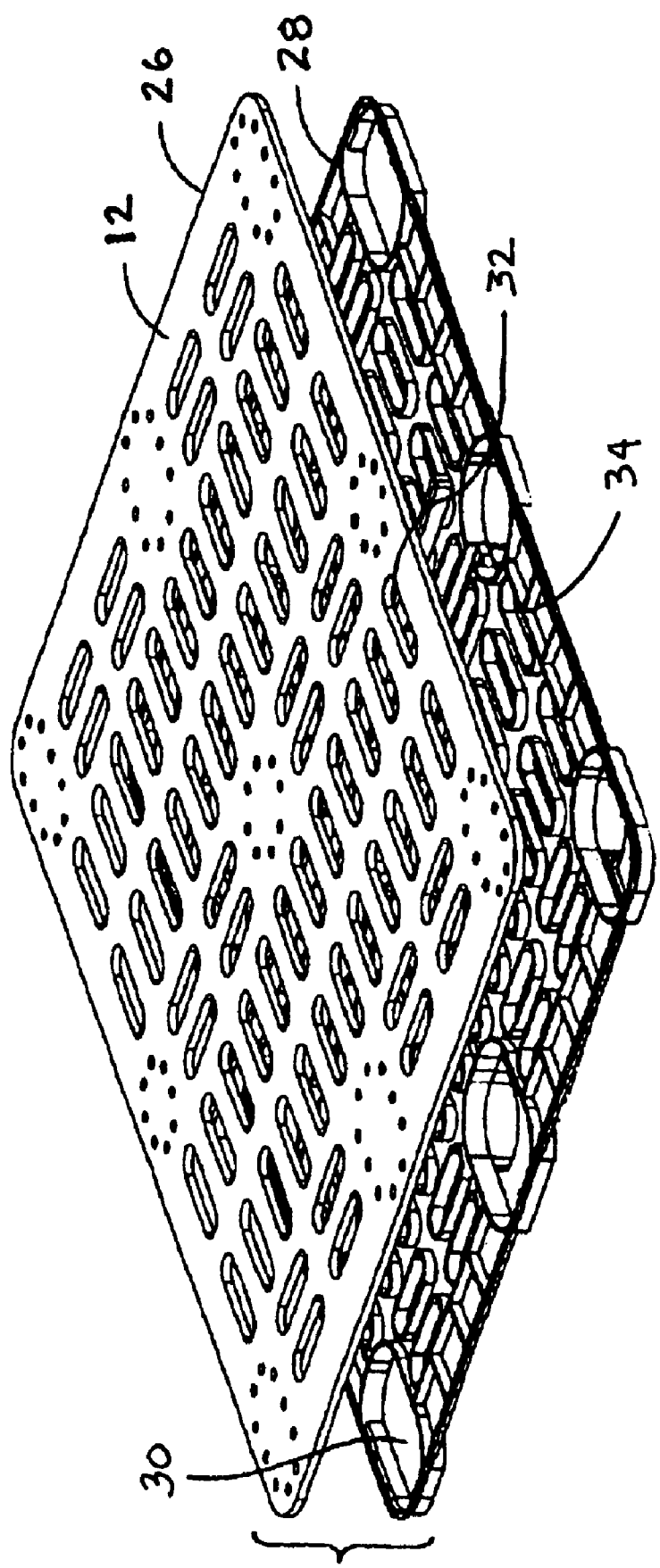
FIG. 2 is an exploded isometric view of a deck for the conventional injection molded pallet assembly shown in FIG. 1.

Referring to the drawings and particularly to FIGS. 1-2, there is illustrated a conventional plastic pallet, generally designated by the numeral 10. The pallet 10 is similar to the GMA style plastic pallet disclosed in U.S. Pat. No. 6,807,910. The pallet 10 is formed from injection molded pallet members.

The pallet 10 includes a deck 12, a base 14, and a plurality of spaced apart columns 16, 18 positioned between the deck 12 and the base 14. The columns 16, 18 include columns 16 positioned at the corner of the pallet 10 and intermediately-positioned columns 18. The deck 12, the base 14, and the columns 16, 18 form a plurality of openings 20 for receiving forklift tines (not shown). A top surface 22 of the deck 12 includes a plurality of openings 24 that provide weight reduction by decreasing the amount of material that is used to form the pallet 10.

The pallet 10 does not include an effective double layered wall because the deck 12 includes less fire retardant materials than the base 14. The pallet openings 24 also provide increased surface area and other pathways for facilitating the spread of fire.

Referring now to FIG. 2, the deck 12 is formed from a top member 26 and a bottom member 28. The bottom member 28 includes column connection sections 30 for receiving the columns 16, 18 from FIG. 1. Each member 26, 28 and column 16, 18 is uniformly molded from a single type of material. Alternatively, the members 26, 28 and columns 16, 18 are constructed from different materials, so that the combination of columns 16, 18 and members 26, 28 includes multiple materials having different fire retardant properties.

The top member 26 includes a plurality of holes 30. The bottom member 28 also includes a plurality of holes 32. The holes 30, 32 join each other when the top member 26 and the bottom member 28 are fused together, so that the surrounding material forms box-like structures to provide a rigid deck 12. The holes 30, 32 also reduce the volume of plastic in the deck 12. Alternatively, the deck 12 includes only a top member (not shown) having column details (not shown) and egg-create structures with openings (not shown).

Figure 3:
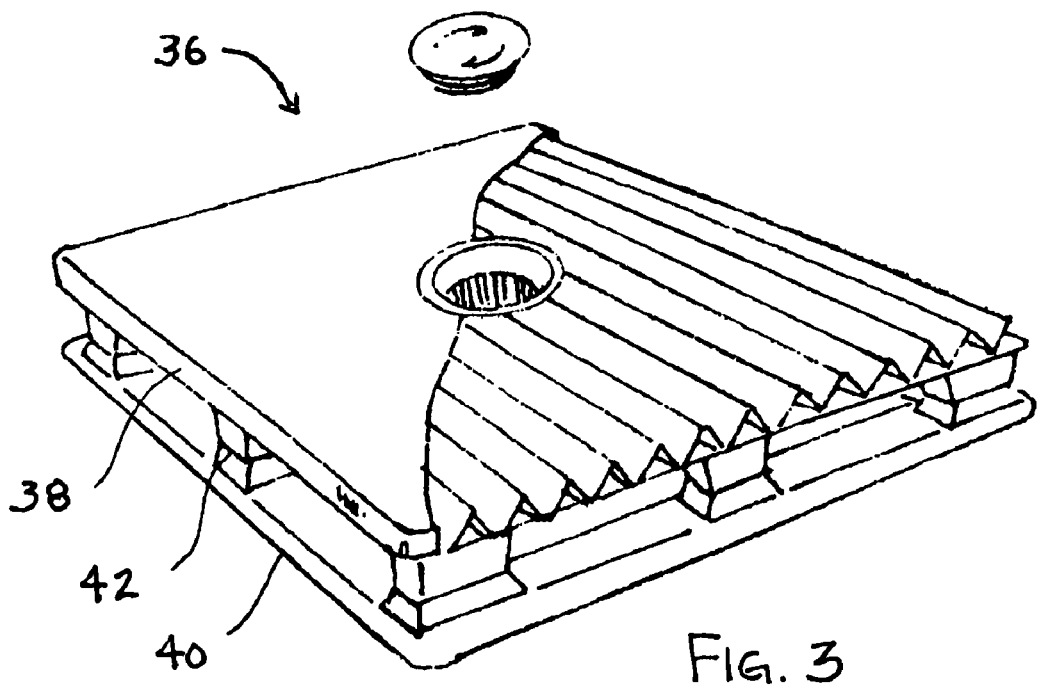
FIG. 3 is an exploded isometric view of a GMA style plastic pallet assembly.

Referring now to FIG. 3, a GMA style rackable pallet assembly in accordance with the present invention and generally designated by the numeral 36 is shown. The pallet assembly 36 has a deck 38, a base 40, and a plurality of columns 42. The columns 42 join the deck 38 to the base 40. Preferably, the deck 38 and the base 40 are each formed from three composite plastic sheets. Alternatively, the deck 38 and base 40 are constructed using twin sheets. The deck 38 and the base 40 snap fit together and apart.

The plastic sheets are made from any suitable material, including, but not limited to, commodity grade polyolefin materials, such as polyethylene and polypropylene. Preferably, the suitable materials include low cost, 100% recyclable materials having a multi-layer wall structure that can withstand extreme handling conditions within a material handling environment.

Suitable multi-layer structures include a two layer structure having a fire retardant layer and a support layer. The fire retardant layer includes a polyolefin material and fire retardant fillers that provide an average peak heat release rate of less than 500 kW/m$^2$ with a heat flux of 35 kW/m$^2$. Preferably, the peak heat release rate is between 500 kW/m$^2$ and 300 kW/m$^2$ and, most preferably, less than 200 kW/m$^2$. The support layer includes a polyolefin material with an effective amount of low resistivity additives imparting high temperature strength. Preferably, the fire retardant layer includes low density polyethylene for skid resistance, cold weather impact strength and excellent processibility and the thick layer of substrate supporting the thin layer is comprised of high density polyethylene for high temperature load strength, ease of processing and good physical properties.

The structure provides a sheet that does not break off during rugged use in the material handling environment, that does not burn, and that does not delaminate. The structure retains its mechanical properties longer under elevated heat, fire, or other hazardous conditions to support a load. Optionally, the structure includes cross-linked polyethylene and polypropylene to provide a uniform, robust, and undelaminatable structure.

The use of commodity grade polyolefin materials reduces the material costs of the pallet. Preferably, the plastic sheets are formed from a polyolefin material having intumescent properties to prevent melting or ignition upon exposure to flame. The intumescent properties are provided from intumescent additives that prevent the polyolefin base material from dripping burning liquid and from spreading the flame. The intumescent additives also react or decompose into a residual insulating foam-like structure that is resistant to burning.

The two layer structure includes comparably less fire retardant additives than a single layer structure. The two layer structure provides increased opportunities to reuse or to recycle the materials. Preferably, the two layer structure includes one or more markers. The markers are used to identify the base resin at the end of the pallet life cycle. The markers allow the resin supplier to recover the material and ensure that the resin originated with the supplier. The markers also allow the resin to be reused because the supplier is able to confirm the identity of the material.

Suitable materials also include relatively low cost materials that utilize fewer expensive fire retardant additives. The GMA style pallet has 80 to 100 percent surface coverage because the pallet uses a combination of sheet products. Suitable combinations include a triple sheet structure that provides an uninterrupted layer upon the top and bottom surfaces of the pallet structure. The use of fewer fire retardant additives also facilitates recycling of the base materials.

The pallet base materials typically include up to 30 wt % magnesium hydroxide, 8 wt % alumina trihydrate, 8 wt % zinc borate, and 54 percent polyolefin resin, so that the fire retardant additives do not exceed 46 wt % of the base materials. The base materials provide a low peak heat release rate according to the test methods of ASTM E1354.

The specific gravity of high density polyethylene, such as Marlex® HXM 50100 from ChevronPhillips Chemical Company LP of Woodlands, Tex., is 0.95 g/cm$^3$. The specific gravity of Mg(OH)$_2$, such as MagShield® S from Martin Marietta of Raleigh, N.C., is 2.36 g/cm$^3$. The specific gravity of alumina trihydrate is 2.4 g/cm$^3$. The specific gravity of zinc oxide, such as Firebrake® ZB from US Borax Inc. of Valencia, Calif., is 2.8 g/cm$^3$. The ratio of plastic to additives by volume in a pallet is closer to 6:1 and 8:1, despite the fact that the ratio of plastic to additives is roughly 1:1 by weight.

The intumescent properties are imparted into the base material through any suitable manufacturing process. Suitable manufacturing processes include blow molding, injection molding, rotational molding as well as any other method in which a first layer can be applied, laminated or otherwise affixed to a second layer to provide twin or triple layer pallet wall. The pallet assembly 36 is constructed through any suitable technique that forms a multi-layer pallet. Preferably, the pallet assembly 36 is formed utilizing a sheet forming technique that produces a twin layer or triple layer pallet. The intumescent properties are imparted upon the outer exposed surfaces of the sheets through a co-extrusion process. The intumescent sheet construction prevents the polyolefin from rapidly melting and dripping burning liquids. The co-extrusion process provides a low cost, layered pallet structure.

The co-extrusion process provides the pallet assembly 30 with an intumescent outer layer covering a portion of or the entire outer surface of the assembly 36. The coverage should exceed 60% of the outer surface to prevent damaging of the objects within the pallets. Also, a higher amount of surface coverage reduces the effective surface area and the potential energy available for supporting a flame.

The use of an intumescent outer layer is necessary because polyolefins have relatively low softening temperatures. Upon exposure to elevated temperatures, the softened polyolefin base material will lose its strength causing the pallet to collapse. The articles that are being stored upon the collapsing pallet will spill off, which may result in additional damage or injury to fire fighters.

The pallet assembly 36 includes a multi-layer wall structure that is amenable to the use of RF tracking devices within a supply chain. The use of a lower amount of hydrated, intercalated and conductive materials in the two layer structure than in a single layer structure provides less interference in the two way transmission of radio frequency signals, and in particular UHF signals preferred for near-field track and trace systems. Preferably, the UHF signals utilize UHF frequency bands of around 860 MHz in Europe, 915 MHz in North America and 960 MHz in Asia.

The pallet assembly 36 is tracked through a network access portal such as the Internet. The pallet assembly 36 includes RF transponder devices that are associated with the pallet assembly 36 to facilitate tracking. The transponder devices have unique identifiers for identifying the pallet assembly 36 within a network. The pallet assembly 36 is positioned between a RF transponder and an interrogator (reader/writer) while it is within a supply chain. Preferably, the pallet includes less than 46 wt % of fire retardant additives to prevent interference with or blocking of the electromagnetic and the electrostatic coupling between the transponder and the interrogator. The fire retardant additives provide an outer layer that has comparably higher RF resistivity than the inner layer.

The plastic pallet base material optionally includes an inner layer having reinforcing fibers, flakes, or fillers and an outer layer having the intumescent additives. The volume fraction of the fibers, flakes, or fillers does not affect the processability of the base material. The fibers, flakes, or fillers also provide a high temperature load bearing strength. Preferably, the ratio of the thickness of the first layer to the second layer is between 4.25:6 or 1:2 to 1:10. Most preferably, the ratio in the range 1:3 to 1:5. The poor processibility of the comparably thin first layer from a 4.24 inch extruder is overcome by the good processibility of the thicker second layer from a 6 six extruder. The combination is RF transparent (less resistive).

The dimensions and style of a particular pallet assembly 36 are selected for a particular application. Suitable pallet styles include customized dunnage for returnable shipping applications. Suitable dimensions include 42×42 inches, 1200×800 mm, 1200×1000 mm, 1140×1140 mm and 1100×1100 mm foot prints fall within the scope of the invention. Preferably, the pallet assembly 36 is a 48×40 inch rackable pallet or a nesting pallet.

Figure 4:
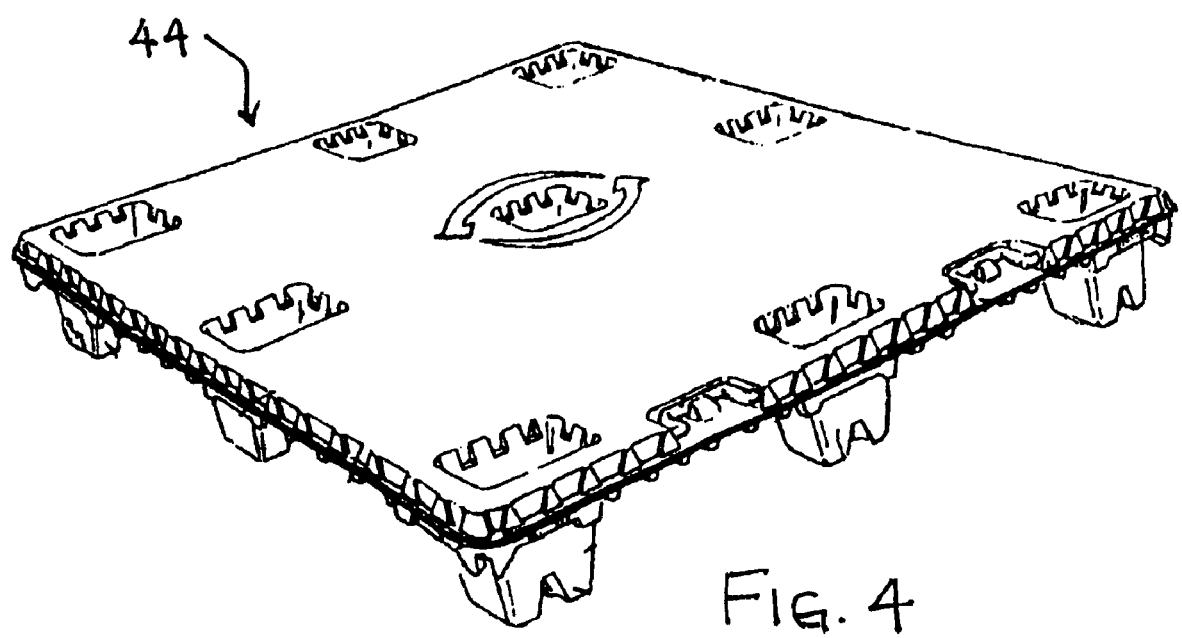
FIG. 4 is an isometric view of a nine-legged plastic pallet assembly.

Referring now to FIG. 4, a nine-legged plastic pallet generally designated by the numeral 44 is shown. The plastic pallet 44 is a nesting pallet that is used for distribution. The pallet 44 is not designed for racking (storage on warehouse racks). The pallet 44 is molded from single, twin, triple and quadruple sheets. Preferably, the pallet 44 includes two or three sheets of molded composite plastics.

Figure 5:
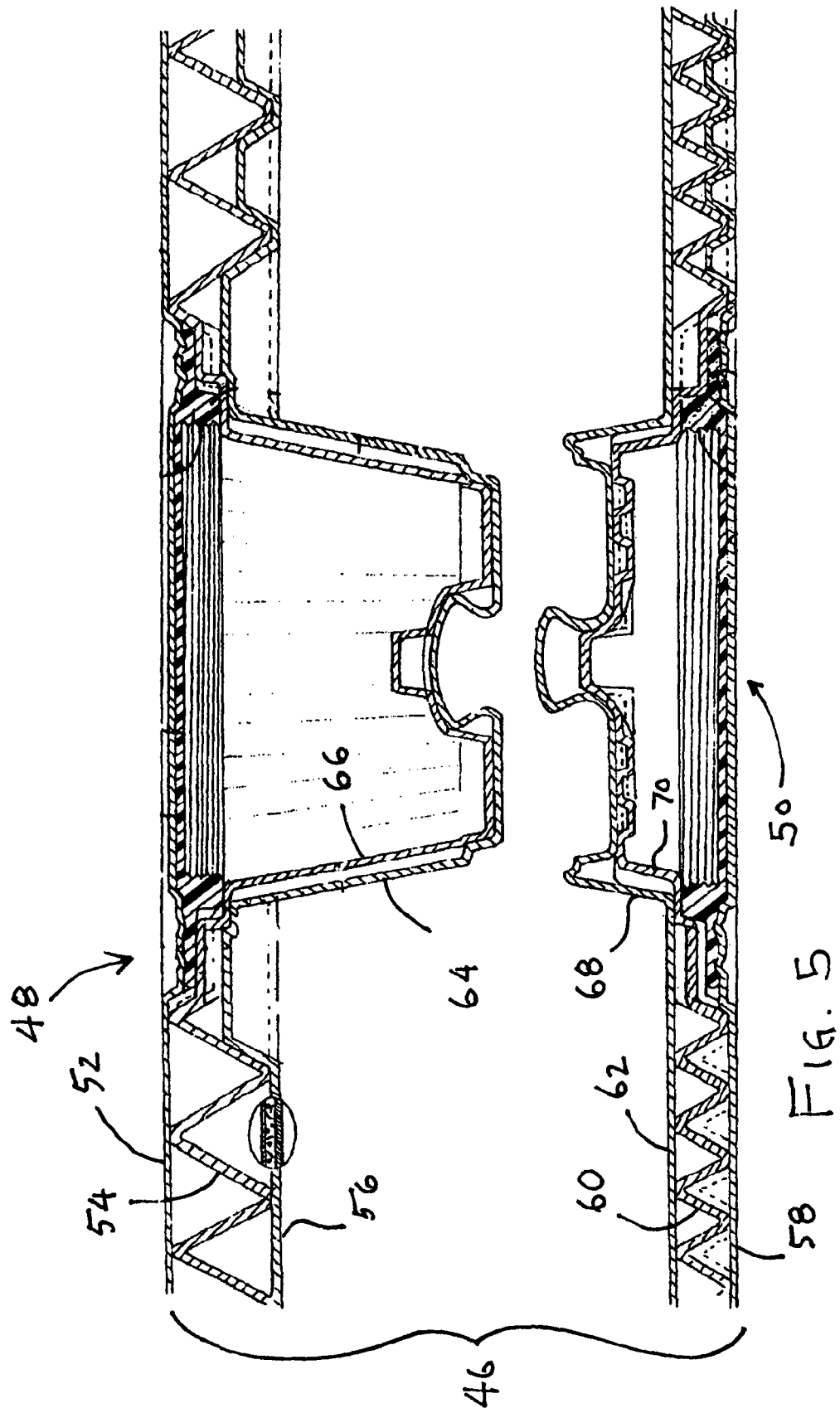
FIG. 5 is an exploded fragmentary cross sectional view in side elevation of two interlocking triple sheet thermoformed deck members.
Figure 6:
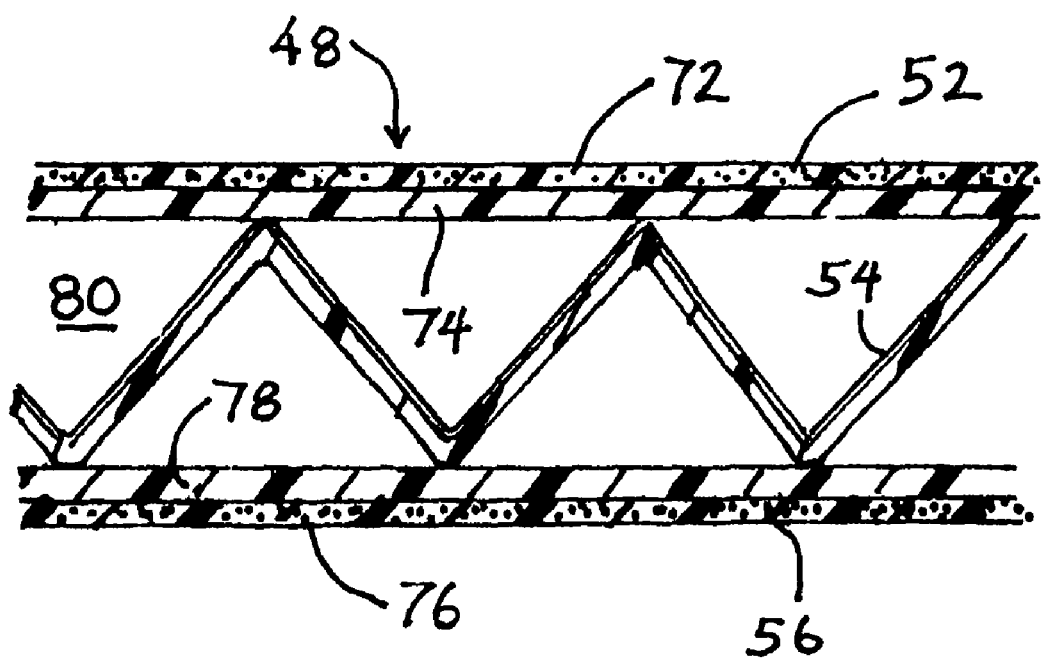
FIG. 6 is a fragmentary cross sectional view in side elevation of a triple sheet thermoformed pallet assembly.

Referring now to FIGS. 5-6, a triple sheet pallet assembly 46 in accordance with the present invention is shown. The pallet assembly 46 includes a deck 48 and a base 50. The deck 48 is formed from three sheets 52, 54, 56. The base 50 is formed from three sheets 58, 60, 62. The sheets 54, 56 also extend downwardly to form a leg 64 having a pocket 66. The sheets 60, 62 extend upwardly to form a leg 68 having a pocket 70. The leg 64 has a deep draw ratio of 400%. Although the legs are shown decending from the deck to the base, the legs alternatively extend from the base to the deck.

As shown in FIG. 6, the sheets 52, 56 are outer sheets. The sheets 52, 56 have intumescent properties to prevent the polyolefin base material from igniting or melting upon exposure to flame. The outer sheet 52 includes an intumescent cap stock or layer 72 and a layer of base material 74. The outer sheet 56 includes an intumescent cap stock or layer 76 and a layer of base material 78.

The intumescent properties of the intumescent layers 72, 76 also prevent the polyolefin base material from dripping burning liquid and from spreading the flame. The intumescent additives in the cap stock 72, 76 also react or decompose to convert the cap stock 72, 76 into a residual insulating foam-like structure that is resistant to burning.

The intumescent layers 72, 76 have superior thermal insulating properties, so that the intumescent efficiency of the pallet surfaces provides a thermal insulation effect. The intumescent materials cooperate with hollow areas of air space 80 provided within the triple sheet pallet construction to help preserve the integrity of the interior structural member of the pallet (i.e. sheet 54). The triple sheet deck 48 provides superior support to a load upon exposure to heat or elevated temperatures, as compared to twin sheet or to injection molded pallets that include the same amount of plastic.

The intumescent layers 72, 76 are made from any suitable intumescent materials. Suitable intumescent materials include reinforced or unreinforced materials. Suitable reinforced materials include reinforcing agents that are dispersed within a resin matrix and are composed of fibers and flakes including glass, carbon and ceramic fibers and flakes; fillers including titanium dioxide, mica, silica, wollastonite, calcium carbonate, sulfates; clays, such as montmorillonite; beads; and nano-particles; or any combination that sustain the stiffness of the plastic structure in elevated temperature conditions.

The base material or structural layers 74, 78 are substantially thicker than the intumescent layers 72, 76. The structural layers 74, 78 are relatively flammable, so that the intumescent layers 72, 76 shield the structural layers 74, 78 from fire damage. The intumescent layers 72, 76 block oxygen from reaching the base material 74, 78. Preferably, the intumescent layers 72, 76 prevent the structural layers 74, 78 from igniting and dripping flaming liquids that spread fire. Alternatively, the intumescent layers 72, 76 delay the spread of fire.

The intumescent layers 72, 76 also insulate the structural layers 74, 78 from excessive heat, which allows the structural layers 74, 78 to retain load bearing strength for a longer period of time. The intumescent layers 72, 76 also generate water, which reduces the intensity of fire (the peak heat release rate). The dual layered structure also allows the use of a lower volume sprinkler system for extinguishing fires.

The intumescent layers 72, 76 and the structural layers 74, 78 include additives. Suitable additives organic nitrogenous gas emitting substances, inorganic water emitting substances, inorganic antioxidants, smoke suppressants, char forming fibers, char forming flakes, char forming fillers, strengthening fibers, strengthening flakes, and strengthening fillers. The additives include conductive materials, such as hydrated alumina, magnesium hydroxide, intercalated graphite, hydrated carbon, zinc borate and antimony oxide. The additives are fire resistant additives, strengthening additives, or fillers.

The fire resistant additives are concentrated in a thin outer layer to attenuate the resistivity of those materials, which results in less RF distortion. A pallet having a fire resistant material distributed within a narrow layered portion of a given wall thickness will have a lower influence on the carrier wave of a given frequency as compared to a fire resistant material dispersed throughout the entire given wall thickness. The lower the penetration depth of a resistive material the lower the distortion. The present invention embodiment attenuates the electric resistivity of a pallet wall by concentrating the fire resistant components that are also RF barrier materials into a thin section or exposed external layer of a thick wall.

The fire resistant or intumescent additives include both halogenated and non-halogenated material components. Preferably, the intumescent additives are non-halogenated material components because halogens present a hazard during the manufacture, use, and disposal of the pallet materials. The use of non-halogenated components also protects fire fighters. Halogens pose an extreme health hazard, and their use is environmentally destructive.

The halogen free intumescent composition includes a polyethylene or polypropylene binder having a vapor generating or inorganic water emitting substance. The vapor generating or inorganic water emitting substance cools down the fire and lowers the heat release rate. Suitable inorganic water emitting substances include hydrated magnesium, alumina, intercalated graphite, hydrated salts, clays, and nano-clays. Suitable salts include salts that dissociate to form acids or bases upon heating, salts of strong acids and weak bases, salts of Lewis acids and bases, ammonium salts (such as ammonium sulfate or ammonium phosphate) and amine salts. Preferably, the inorganic water emitting substance is a hydrated salt, clay, or a nano-clay because fire retardant compositions that include hydrated magnesium, alumina, or intercalated graphite can distort RF signals.

Suitable non-halogenated materials also include an organic agent that releases a gas, such as a nitrogenous gas, that inhibits combustion. The nitrogenous gas-generating ingredients reduce the heat during burning and also help foam the polymer matrix to provide an insulating char structure. Suitable nitrogenous gases include urea, melamine, cyanurate, carbante, polyamide and the like.

Suitable non-halogenated fire retardant materials also include intumescent materials that include certain ammonium salts, such as ammonium polyphosphates having the chemical formula $(NH_4PO_3)_n$. The ammonium polyphosphates are used in a lower concentration than water generating agents. The ammonium polyphosphates include a suitable carbon supply, such as starch or pentaerythritol, to help in char formation, and melamine to assist in expanding the char. Additionally, the ammonium polyphosphates have superior properties with respect to lowering RF resistivity, as compared to hydrated metals.

Suitable non-halogenated compositions also include smoke suppressants, such as an antimony compound, a boron compound, a phosphorus compound, or any other suitable metal compounds.

Preferably, the halogen free intumescent formulation comprises, on the basis of 100 parts by weight, 20-45 parts polyethylene or polypropylene, 10-35 parts of an inorganic water vapor generating agent, 5-25 parts of a nitrogenous gas generating agent, 1-5 parts of an antioxidant, and 0-15 parts of a reinforcing agent. Optionally, the non-halogenated composition includes reinforcing agents and heat stabilizing antioxidants. Suitable antioxidants include distearylthiodipropionate (DSTDP), hindered phenols and commercial products including Wingstay® L.

One or more of the constituent groups of the above described intumescent formulation can be omitted with successful results. However, other ingredients may be included provided that the material is halogen free and is, preferably, transparent to RF signals.

The concentration of fire resistant additives in a thin outer layer also provides a GMA style pallet that weighs 50 pounds or less. Fire retardant materials (for example metal hydroxides) are significantly heavier than polyethylene and polypropylene (+/−2.5 times). By concentrating the comparably heavy additives in only one layer of a two layer structure a lesser amount of additives are used to provide an effective result. A smaller amount of heavier additives yields a lighter weight pallet, providing reduced transportation fuel costs and improved ergonomics. The concentration of fire resistant additives in the outer layer also improves the processibility of non-halogenated materials.

The use of low density polyethylene or linear low density polyethylene outer layer also provides skid resistance and improved processibility. Low density polyethylene and linear low density polyethylene have longer molecular chains, as compared to high density polyethylene or ultra high molecular weight polyethylene. The longer molecular chains provide a higher coefficient of friction, which provides higher skid resistance than high density polyethylene or ultra high molecular weight polyethylene. Preferably, the coefficient of static friction is higher than 0.4 for the top surface of a pallet member and is higher than 0.15 for the bottom surface of a pallet member.

In a two layer structure where the binder of the first fire resistant layer and the substrate of the second structural layer cross link to provide a uniform, undelaminatable structure, there will be less tendency for the first layer to fry during fire or break off during robust use, thereby exposing an inside layer to potential fire damage.

The intumescent system has excellent thermal insulating properties. These properties provide protection for the interior structural sheet 54 and layers 74, 78 against the heat that is generated by the high temperature of the combustion flame. This protection prevents the interior structural sheet 54 and layers 74, 78 from softening upon exposure to heat, so that the pallet will be able to maintain its load carrying properties.

Optionally, the pallet 44 includes cross members (not shown) that are inserted into the pallet 44 or positioned on recesses located in a surface on the pallet 44 to provide additional load bearing strength. The cross members (not shown) have intumescent properties to decrease the pallet structure thermal conductivity. The cross members (not shown) help protect fire fighters working adjacent to the pallet loads when the pallet 44 is suspended in idle storage upon warehouse racks during a fire. The cross members (not shown) also help reduce the damaging consequences of a fire by maintaining the stored articles upon the pallets.

Figure 7:
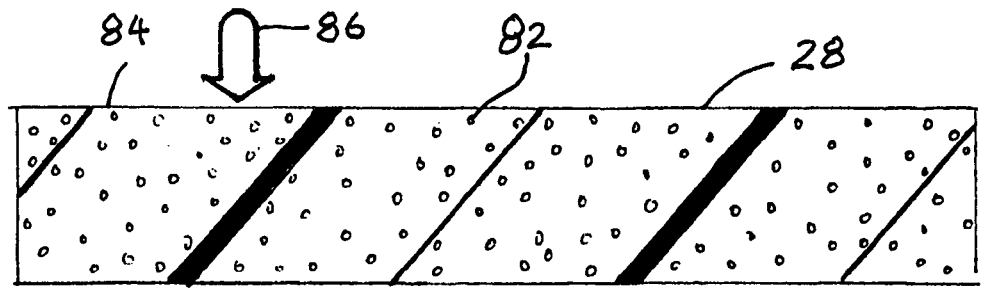
FIG. 7 is a cross sectional view in side elevation of a deck member that is constructed out of a composite material.

Referring now to FIG. 7, the member 28 shown in FIG. 2 is constructed out of an engineered composite. The member includes fire retardant additives 82 that are dispersed uniformly throughout a matrix 84, as in an injection molded or structural foam molded polyethylene or polypropylene resin product. A radio frequency signal, such as a UHF signal 86, travels through the member 28 to exit as an attenuated UHF signal 88. This is in marked contrast to the embodiments indicated in FIGS. 8-10, where the walls involve a plurality of layers, with three layered examples provided.

Figure 8:
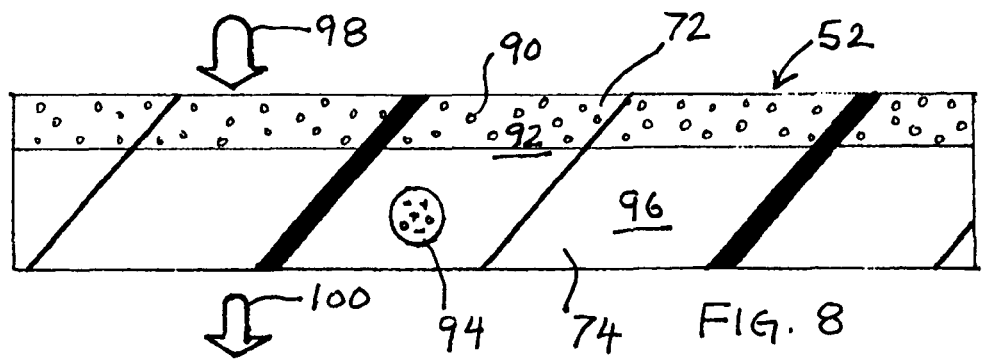
FIG. 8 is a cross sectional view in side elevation of a deck member having a twin layer wall.

Referring now to FIG. 8, the sheet 52 shown in FIG. 5 includes the intumescent layer 72 and the structural layer 74. The intumescent layer 72 includes intumescent additives 90 to impart fire resistance and a matrix 92. The structural layer 74 includes reinforcing agents 94 and a matrix 96. A radio frequency signal, such as a UHF signal 98, travels through the member 52 to exit as an attenuated UHF signal 100.

As shown in FIGS. 7-8, the attenuated UHF signal 88 is substantially weaker than the attenuated UHF signal 100 because the intumescent layer 72 is substantially thinner than the structural layer 74. The intumescent additives 90 are resistant to the UHF signal. The relative thickness of the structural layer 74 to the intumescent layer 72 provides less attenuation of the UHF signal because the intumescent additives 90 are concentrated in the intumescent layer 72. Coupling between the transponder and the interrogator is less distorted and prone to miscommunication in the embodiment shown in FIG. 8 compared to the embodiment shown in FIG. 7.

Figure 9:
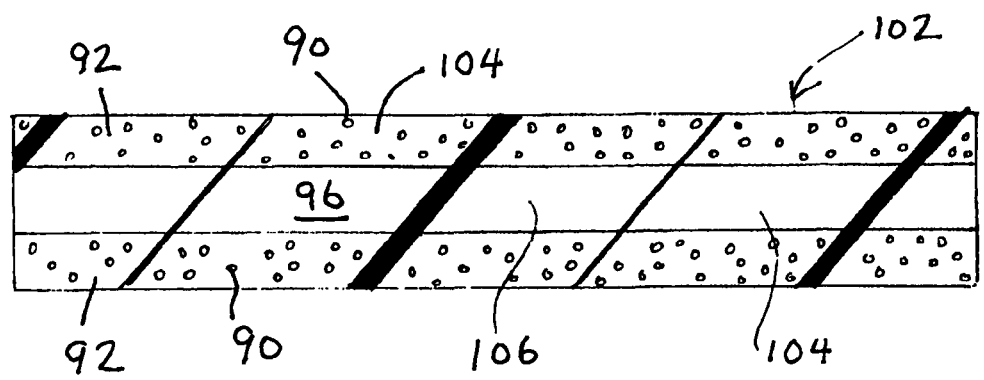
FIG. 9 is a cross sectional view in side elevation of a deck member having a triple layer wall.

Referring now to FIG. 9, a sheet 102 is shown. The sheet 102 is a substitute for the sheets 52, 56, 58, 62 shown in FIG. 5. The sheet 102 includes two intumescent layers 104 and an interior layer 106. The intumescent layers 104 are positioned at outer surfaces, so that they are exposed to any potential source of fire or flames. The intumescent layers 104 are essentially identical in composition to the intumescent layer 72 shown in FIG. 8.

The interior layer 106 is essentially identical in composition to the structural layer 74 shown in FIG. 8. Preferably, the interior layer 106 includes a high density polyethylene or ultra-high molecular weight polyethylene matrix 96.

The intumescent layers 104 are made from any suitable intumescent materials. Suitable intumescent materials include, but are not limited to intumescent materials that include polyethylene and polypropylene materials. Suitable polyethylene and polypropylene materials include formulations that include regrind, recyclable byproducts of the manufacturing process, or a formulation comprising a polyethylene or polypropylene resin grade that is different from the polyethylene and polypropylene resin formulations contemplated in layer 106. Optionally, the layers 104 include fillers, flakes, fibers, or other similar materials.

Suitable intumescent materials also include linear low density polyethylene resins that provide improved hot tack adhesion for the bonding. Optionally, the sheet 102 includes additional layers that include tie layers (not shown) to join the layers 104, 106 to one another. Such tie layers include, but are not limited to, a polyethylene layer, a polypropylene layer, or an EVOH layer. U.S. Pat. No. 6,661,339 describes such sheets having desirable barrier and performance properties and is hereby incorporated by reference.

The sheet 102 is produced by any suitable manufacturing process. Suitable processes include an ordinary co-extrusion process utilizing a 4.25 inch extruder and a 6 inch extruder in tandem to provide a uniform sheet. The thicker substrate emanating from the six inch extruder can therefore be modified with strengthening additives that are not used in a fire resistant formulation to provide a layered material combination with acceptable processability.

Figure 10:
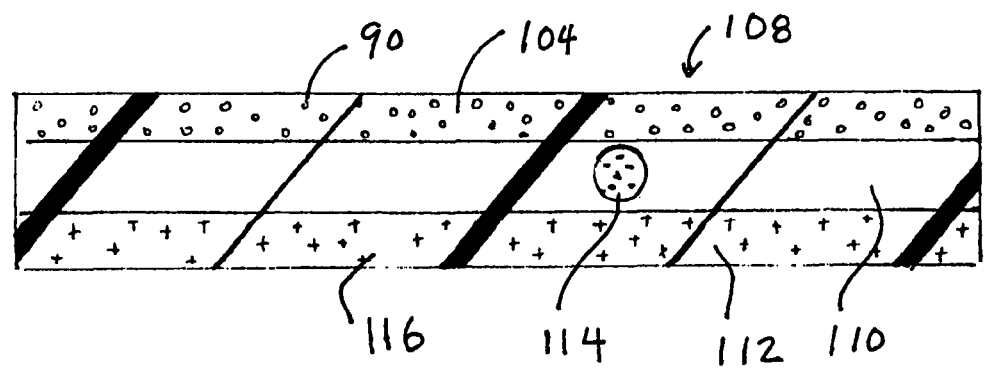
FIG. 10 is a cross sectional view in side elevation of a deck member having a triple layer wall with reinforcing flakes, fibers, or fillers.
Figure 11:
FIG. 11 is a schematic diagram of a cross section of a single walled pallet member.

Referring now to FIG. 10, a sheet 108 is shown. The sheet 108 includes an intumescent layer 104, an interior layer 110, and a structural layer 112. The interior layer 110 is essentially the same as the interior layer 106 shown in FIG. 9. However, the interior layer 110 includes a reinforcing agent 114. The structural layer 112 includes reinforcing agents or fillers 116.

Referring now to FIGS. 11-15, additional embodiments of pallet structures 116, 118, 120, 122, and 124 are shown. The pallet structure 116 is a single walled pallet structure that is made from a single sheet 128 layered material. The pallet structure 118 is a double walled pallet structure. The pallet structure 120 is a triple walled pallet structure that is similar to the pallet structure shown in U.S. Pat. No. 6,749,418.

Figure 12:
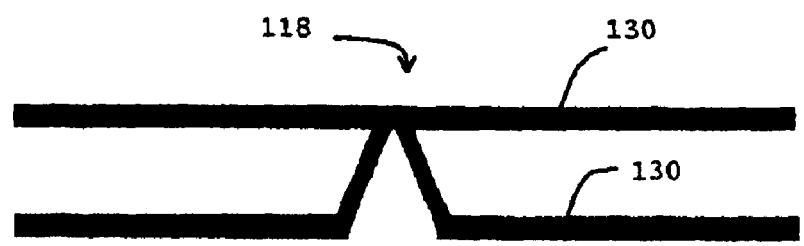
FIG. 12 is a schematic diagram of a cross section of a twin walled pallet member.
Figure 13:
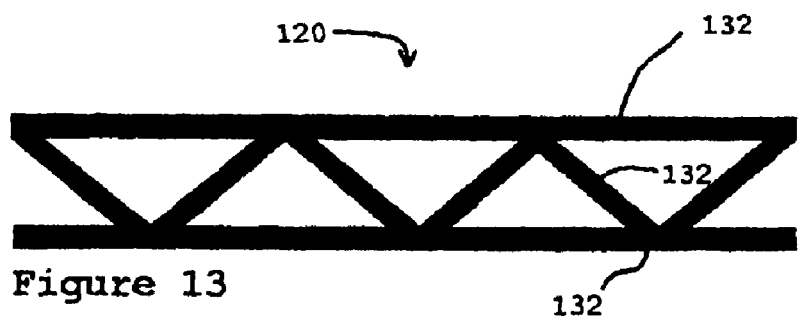
FIG. 13 is a schematic diagram of a cross section of a triple walled pallet member.

As shown in FIGS. 12-13, the sheets 130, 132 are formed into ribbed structures to provide stiffness. The pallet structure 118 is a double walled pallet structure that is made from two sheets 130 of layered material. The pallet structure 120 is a triple walled pallet structure that is made from three sheets 132 of layered material.

Figure 14:
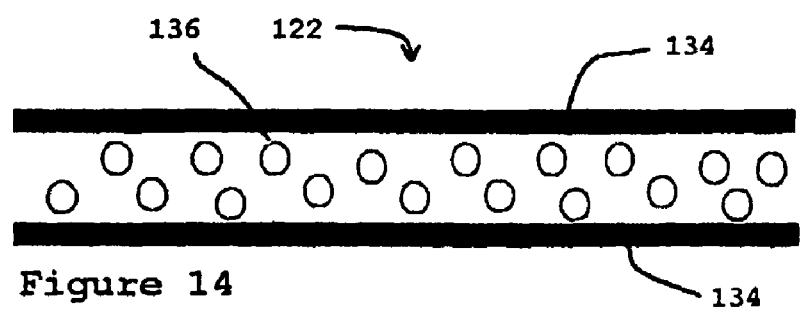
FIG. 14 is a schematic diagram of a cross section of a pallet member having enclosed foamed structures.
Figure 15:
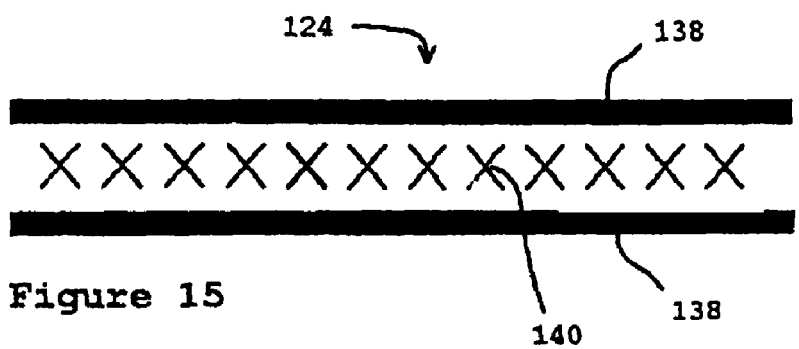
FIG. 15 is a schematic diagram of a cross section of a pallet member having separately molded reinforcing structures inserted therein.

Referring now to FIGS. 14-15, the pallet structures 122, 124 are sandwich-type structures that include additional materials that provide rigidity. The pallet structure 124 includes a pair of outer sheets 134 that enclose a foam structure 136. The pallet structure 126 includes a pair of outer sheets 138 that enclose separately molded inserts 140.

While the illustrative embodiment is a pallet, it should be understood the invention is practiced in the form of other material handling devices including bins, totes, containers, tanks and the like. In order to obtain a plastic pallet that has high temperature load bearing strength, fibers, flakes and fillers are added to the plastic material. In the preferred embodiment fibers, flakes and fillers are added in an effective concentration that provides acceptable processability to the substrate layer. Acceptable processability involves, in the present preferred embodiment of a thermoformed pallet, a PE and PP plastic sheet that has at a minimum a 4:1 draw ratio capable of forming the deep leg pockets of a pallet structure.

It should also be understood that the pallet structures can be made of any plastic, wood, metal, cellulose material or combination thereof. The pallet structures may be injection molded, blow molded, compression molded, differential pressure formed, stamped, die-cut, fabricated and assembled, welded, glued and bonded together. The pallets can take the form of GMA style 48×40 inch pallets, nine-legged nestable pallets, shipping trays, returnable dunnage, slaves and the like. Other products falling within the scope of the invention include IBCs, RPCs, ULDs, fuel tanks and the like.

It should also be understood that replacing hydrated alumina $Al(OH)_3$ with hydrated magnesium $Mg(OH)_2$ for plastic pallets provides materials having superior molding temperature resistance. A small measure of $Al(OH)_3$ can however be used along with a large measure $Mg(OH)_2$ to initiate an earlier response to the heat of fire.

It should also be understood that the use of hydrated carbon materials to produce a fire resistant pallet is also contemplated. Upon heating to the boiling point of water a hydrated carbon can be developed to expand to 80 times its original size through the exfoliation (enlargement) of the water molecules. The high heat of the thermoforming ovens used in pallet manufacturing, for example, would cause the sheet material containing hydrated carbon to decompose during manufacture rather than during an intended fire related emergency.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A pallet structure for lowering resistance to radio frequency signals comprising:
   a thermoplastic pallet body including a first member having an exterior fire retardant layer and an internal support layer and a second member having a fire retardant layer and a support layer,
   said fire retardant layer including a first polyolefin material and fire retardant fillers that provide an average peak heat release rate of less than 500 $kW/m^2$ with a heat flux of 35 $kW/m^2$, said fire retardant fillers reducing the strength of radio frequency signals,
   said support layers including a second polyolefin material with additives that do not reduce the strength of radio frequency signals,
   a RF transponder having a preselected identifier for identifying the pallet within a RFID network positioned in said pallet body,
   said pallet body having a lowered resistance to radio frequency signals communicated between the RF transponder and a RF interrogator because the fire retardant fillers are not provided in the support layers, and
   said fire retardant layer and said support layer being substantially halogen free.

2. A pallet as set forth in claim 1 in which:
   said fire retardant layers include low density polyethylene, and
   said support layers include high density polyethylene.

3. A pallet as set forth in claim 2 in which:
   said fire retardant layers are integral with said support layers, and
   said fire retardant layers are positioned against said support layers through extrusion.

4. A pallet as set forth in claim 2 in which:
   said low density polyethylene is selected from the group consisting of a very low density polyethylene and a linear low density polyethylene, and
   said low density polyethylene has an effectively high co-efficient of surface friction to provide skid resistance as compared to the lower co-efficient friction of the high density polyethylene.

5. A pallet as set forth in claim 1 in which:
   said fire retardant fillers are selected from the group consisting of $Al(OH)_3$, $Mg(OH)_2$, intercalated graphite, hydrated salts, clays, and nano-clays.

6. A pallet as set forth in claim 5 in which:
   said fire retardant fillers include $Al(OH)_3$ and $Mg(OH)_2$, and
   the amount of said $Mg(OH)_2$ is greater than the amount of said $Al(OH)_3$.

7. A pallet as set forth in claim 1 which includes:
   a deck having a first and second fire retardant layer and a first and second support layer with a space between said support layers,
   a base having a first and second fire retardant layer and a first and second support layer with a space between the support layers, and
   at least one transponder positioned within at least one space of said deck and said base.

8. A plastic pallet for use in a RF tracking system comprising:
   a radio frequency transponder integral with the plastic pallet for communicating within a distributed network of radio frequency interrogators,
   a pallet body having an outer layer positioned on the exterior of said pallet body and an inner layer positioned on an interior of said pallet body, said inner layer providing load support to said outer layer,
   said outer layer having fire retardant additives for reducing the flammability of the plastic pallet including conductive fire retardant materials that distort radio frequency signals of the RF tracking system, and
   said outer layer being substantially thinner than said inner layer to provide an effectively lower over-all radio frequency signal distortion effect on transponder communications within the RF tracking system.

9. A plastic pallet as set forth in claim 8 in which:
   said fire retardant additives are selected from the group consisting of organic nitrogenous gas emitting substances, inorganic water emitting substances, inorganic antioxidants, smoke suppressants, char forming fibers, char forming flakes, char forming fillers, strengthening fibers, strengthening flakes, and strengthening fillers, and
   one or more of said additives are materials that distort and weaken radio frequency signals communicated between said transponder and said interrogator.

10. A plastic pallet as set forth in claim 9 in which:
    said additives are selected from the group consisting of hydrated alumina, magnesium hydroxide, intercalated graphite, hydrated carbon, zinc borate and antimony oxide.

11. A plastic pallet as set forth in claim 8 in which:
    said pallet body has an average peak heat release rate that is lower than 500$kW/m^2$ with a heat flux of 35 $kW/m^2$.

12. A plastic pallet as set forth in claim 8 in which:
    said pallet body is substantially halogen free.

13. A plastic pallet as set forth in claim 8 in which:
    said outer layer has low density polyethylene for skid resistance, cold weather impact strength and excellent processibility, and
    said inner layer supporting said outer layer and having high density polyethylene for high temperature load strength, ease of processing and good physical properties.

14. A plastic pallet as set forth in claim 8 in which:
    said outer layer has comparably higher radio frequency signal resistivity than said inner layer.

15. A plastic pallet as set forth in claim 8 in which:
said radio frequency trasponder utilizes a UHF frequency band.

16. A plastic pallet as set forth in claim 15 in which:
the UHF frequency band includes around 860 MHz in Europe, 915 MHz in North America and 960 MHz in Asia.

17. A plastic pallet as set forth in claim 8 which includes:
a marker used to selectively identify the materials forming the pallet within a resin supply chain.

18. A polymer pallet having attenuated electrical resistance comprising:
a radio frequency transponder being responsive with an expectation of immediate reply to query signals from an interrogator within a RFID network,
a pallet body having a wall surrounding said transponder, said wall having a first polymer layer and a second polymer layer supporting said first polymer layer,
said first polymer layer having radio frequency signal distorting materials selected from the group consisting of $Al(OH)_3$, $Mg(OH)_2$, intercalated graphite, hydrated carbon, zinc borate, and antimony oxide, said materials having a higher specific gravity than said first and second polymers,
said second polymer layer being substantially free of said materials and having a higher density than said first polymer and a lower electrical resistivity than said first polymer layer of said pallet body, and
said first polymer layer being thinner than said second polymer layer whereby with said combination of layers the radio frequency signals are weakened by only a comparably thin first polymer layer of the wall of the pallet.

19. A polymer pallet structure comprising:
a transponder for identifying the pallet within a RFID network,
two shell halves surrounding said transponder,
said transponder receiving radio frequency signals from an interrogator through said shell halves,
said shell halves having a combined wall with a thickness that radio frequency signals must pass through to communicate with said transponder,
said combined wall having a surface layer fabricated of a first polyethylene blend with a halogen free water emitting substance that interferes with radio frequency signals,
a support layer fabricated of a second polyethylene blend with a filler selected from the group consisting of strengthening fibers, flakes and fillers that do not interfere with radio frequency signals passing therethrough,
said surface layer and said support layer forming a layered combination for attenuating radio frequency signal interference by reducing the effective resistivity of the signal penetration depth of the wall thickness.

20. A polymer pallet for attenuating resistivity to radio waves used by a transponder to respond to a query signal of an interrogator with the polymer pallet positioned between the transponder and the interrogator comprising:
a pallet body having a first layer with fire retardant materials added therein and a second layer being substantially free of said fire retardant materials,
said first layer being co-extruded with said second layer to form a uniform wall having sufficient thickness to support a load, and
said wall propagating a magnetic field interfering with radio waves emanating from an interrogator source being positioned in a direction adjacent to the first layer to a transponder positioned in a direction adjacent the second layer behind said pallet body whereby said magnetic field is lower with said fire retardant materials in the first layer than if said materials were included in said second layer or in both said first and second layers.

* * * * *